(12) United States Patent
Schaefer et al.

(10) Patent No.: US 11,714,576 B2
(45) Date of Patent: Aug. 1, 2023

(54) MEMORY BUS DRIVE DEFECT DETECTION

(71) Applicant: Micron Technology, Inc., Boise, ID (US)

(72) Inventors: Scott E. Schaefer, Boise, ID (US); Melissa I. Uribe, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/505,046

(22) Filed: Oct. 19, 2021

(65) Prior Publication Data
US 2022/0137880 A1 May 5, 2022

Related U.S. Application Data
(60) Provisional application No. 63/106,962, filed on Oct. 29, 2020.

(51) Int. Cl.
*G06F 13/16* (2006.01)
*G06F 3/06* (2006.01)

(52) U.S. Cl.
CPC .......... *G06F 3/0659* (2013.01); *G06F 3/0614* (2013.01); *G06F 3/0679* (2013.01); *G06F 13/1668* (2013.01); *G06F 2213/16* (2013.01)

(58) Field of Classification Search
CPC .... G06F 3/0659; G06F 3/0674; G06F 3/0679; G06F 13/1668; G06F 2213/16
USPC ........................................................ 711/154
See application file for complete search history.

(56) References Cited

U.S. PATENT DOCUMENTS

| | | | |
|---|---|---|---|
| 7,257,660 B2 * | 8/2007 | Chang | G06K 19/077 710/301 |
| 8,294,474 B2 * | 10/2012 | Ahrens | H04L 25/08 324/543 |
| 9,026,895 B2 | 5/2015 | Ou | |
| 9,153,296 B2 * | 10/2015 | McCall | G11C 7/1078 |
| 10,917,093 B1 * | 2/2021 | He | G11C 7/1084 |
| 11,024,353 B1 * | 6/2021 | Agrawal | G11C 29/12005 |
| 2004/0156242 A1 * | 8/2004 | Iida | G06K 19/07 365/185.28 |

(Continued)

OTHER PUBLICATIONS

"International Search Report and Written Opinion of the International Searching Authority," issued in connection with Int'l Appl. No. PCT/US21/55859, dated Feb. 9, 2022 (10 pages).

*Primary Examiner* — Christopher B Shin
(74) *Attorney, Agent, or Firm* — Holland & Hart LLP

(57) ABSTRACT

Methods, systems, and devices for memory bus drive defect detection and related operations are described. A controller coupled with a memory array may receive a command for data. The memory array may include one or more pins for communicating data to and from the memory array, in response to the command. The controller may transmit to the memory array, over a bus that is coupled with the controller and the pins, the command. The controller may detect, based at least in part on a resistor coupled with the bus and a power supply of the memory array, that the bus is operating in a first state after transmitting the command. The first state may comprise a voltage that is relatively higher than a voltage of the second state. The controller may determine a defect associated with the bus or the pin based on detecting the bus in the first state.

30 Claims, 9 Drawing Sheets

(56) References Cited

U.S. PATENT DOCUMENTS

| | | | |
|---|---|---|---|
| 2004/0158781 A1* | 8/2004 | Pihet | H04L 12/40013 |
| | | | 714/712 |
| 2006/0238204 A1* | 10/2006 | Swope | G01R 19/16538 |
| | | | 324/522 |
| 2007/0051806 A1* | 3/2007 | Fujimoto | G11C 5/143 |
| | | | 235/441 |
| 2014/0146626 A1 | 5/2014 | Booth et al. | |
| 2015/0347325 A1 | 12/2015 | Hutchison et al. | |
| 2017/0075603 A1 | 3/2017 | Trantham | |
| 2019/0243544 A1 | 8/2019 | Wang | |
| 2019/0304517 A1* | 10/2019 | Moon | G11C 7/222 |
| 2021/0294504 A1* | 9/2021 | Shirakura | G06F 3/0625 |
| 2022/0020419 A1* | 1/2022 | Wu | G11C 7/1084 |

\* cited by examiner

MEMORY BUS DRIVE DEFECT DETECTION

CROSS REFERENCE

The present Application for Patent claims the benefit of U.S. Provisional Patent Application No. 63/106,962 by Schaefer et al., entitled "MEMORY BUS DRIVE DEFECT DETECTION," filed Oct. 29, 2020, assigned to the assignee hereof, and expressly incorporated by reference herein.

FIELD OF TECHNOLOGY

The following relates generally to one or more systems for memory and more specifically to memory bus drive defect detection.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
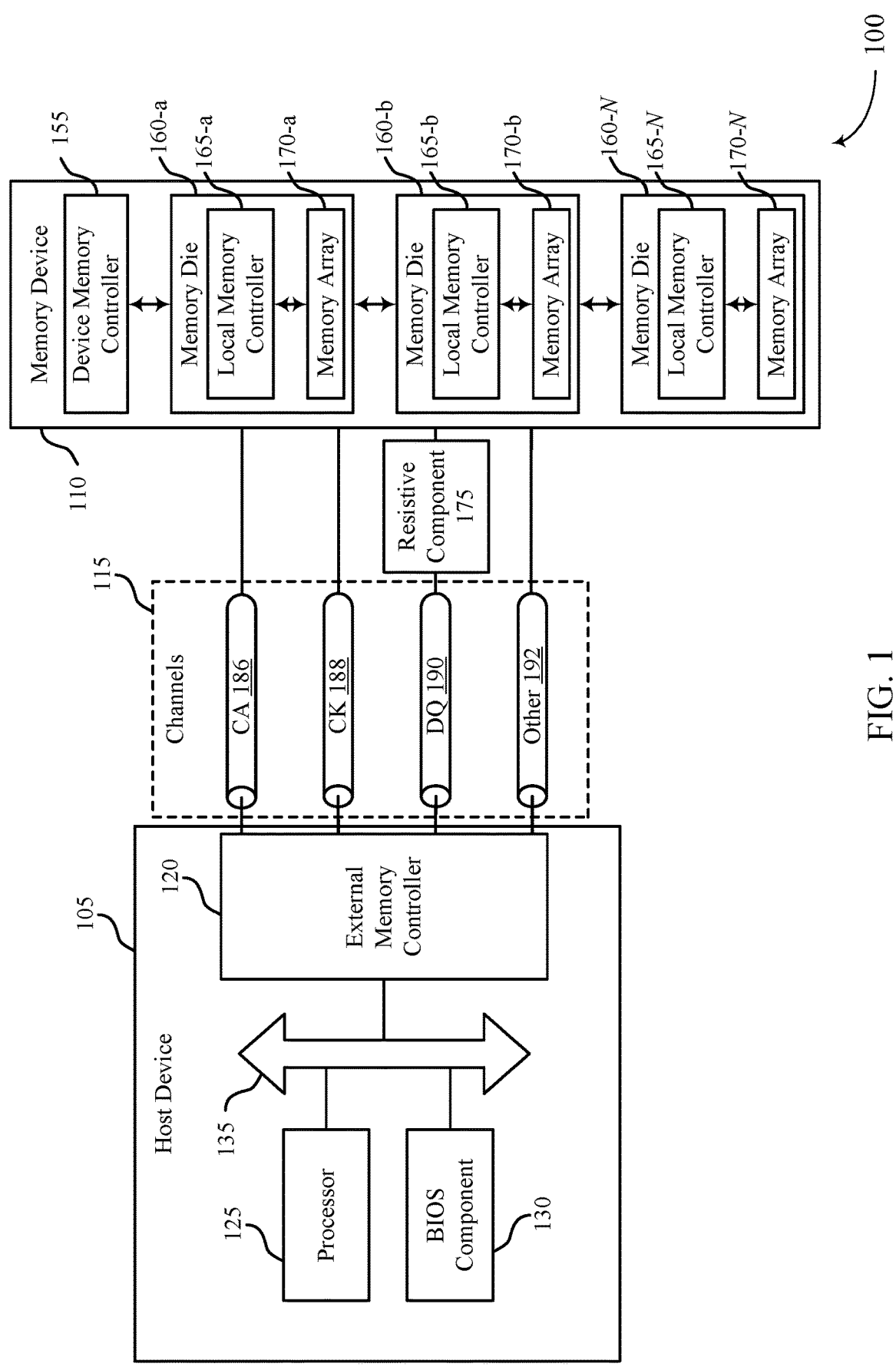
FIG. 1 illustrates an example of a system that supports memory bus drive defect detection in accordance with examples as disclosed herein.

A system may include a host device and a memory device coupled by a bus that communicates data, commands, and signals between the host device and the memory device. In some examples, the system may be an automotive system. In such examples, the memory device may serve as a storage device for the electrical systems or subsystems of the automotive system. The system may also be designed to conform to certain industry standards or specifications. For example, the automotive system may be designed to conform to meet an Automotive Safety Integrity Level (ASIL) hardware metric standard. Additionally or alternatively, the memory device may also be designed to meet a specific failure in time per billion of operation (e.g., a FIT rate) to achieve safety standards or specifications. In some examples, manufacturing the memory device to achieve the FIT rates may be challenging. For example, the memory device may include data (DQ) pins that communicate data to and from the memory device to the host device over the bus. In some examples, either the DQ pins or the bus that communicates the data (or both) may have a defect—e.g., a bond wire may break or a short may occur in the memory device or bus, among other conditions. In such examples, the bus may be terminated to ground. Additionally, in some examples, the memory device may drive the bus to ground when communicating data in response to a command transmitted by the host device—e.g., the memory device may drive the bus to ground when communicating a logic state zero (0) to the host device. Because the bus may be terminated to ground due to a defect or while communicating data, the host device may be unable to determine whether the bus is grounded due to the defect or communicating the data. Thus, the system may function improperly because the system may be unable to detect the difference between these conditions, among other examples. In such examples, the memory device FIT may also be or at least appear to be higher than the industry standard or specification—e.g., the system may fail or at least appear to fail more than an acceptable level as the host device is unable to recognize whether the memory device is communicating data or is associated with a defect.

Systems, techniques, devices, are described herein for a system that includes a resistive component, such as a resistor or a bank of transistors operating in a region for example, a linear region (e.g., a region between a power supply and a bus), coupled with a power supply for a memory device and a bus that communicates data between the memory device and a host device, to operate the bus in a first state associated with an absence of data being communicated over the bus. For example, a relatively high resistance resistor may be coupled with at least one DQ pin of the memory device and the power supply. In such examples, the bus may float in a relatively high state when there is an absence of data being communicated over the bus between the host device and the memory device. Additionally, the memory device may drive the bus to ground when communicating a logic state zero (0)—e.g., the bus may be in a second state associated with a voltage that is relatively lower than the voltage of the first state when communicating data. That is, after the host device transmits a command for data to the memory device, the host device may determine an error associated with the bus or the one or more pins by detecting the bus in the first state (e.g., the floating state). Alternatively, the host device may determine the memory device is communicating a logic state (0) when the bus is in the second state (e.g., the ground state) in response to the command sent by the memory device. By enabling the host device to determine between when the bus is associated with a defect or when the bus is communicating a logic state (0) based on the one or more components indicated the first state or the second state, the memory device may achieve an acceptable FIT rate, among other benefits.

Features of the disclosure are initially described in the context of systems and dice as described with reference to FIGS. 1 and 2. Features of the disclosure are described in the context of systems and process flows as described with reference to FIGS. 3 and 4. These and other features of the disclosure are further illustrated by and described with reference to an apparatus diagram and flowcharts that relate to memory bus drive defect detection as described with reference to FIGS. 5-9.

FIG. 1 illustrates an example of a system 100 that supports memory bus drive defect detection in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dice 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dice may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dice 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controller 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal). In some examples, the channels 115 may also be referred to as buses (e.g., buses 115).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

In some examples, the system 100 may include a resistive component 175 coupled with the DQ channel 190 and power supply of the memory device 110 (not shown). The DQ channel 190 may be coupled with a DQ pin of the memory device. In some examples, there may be a DQ channel 190 for each DQ pin of the memory device. The resistive component 175 may be configured to cause the DQ channel 190 to operate in a first state having a voltage relatively higher than a voltage for a second state—e.g., when the memory device 110 or host device 105 communicates a logic state zero (0). The resistive component 175 may cause the bus to operate in the first state by pulling up the voltage of the DQ channel 190. The first state may be associated with an absence of data being communicated over the DQ channel 190. In some examples, the resistive component 175 may be an example of a resistor. In other examples, the resistive component 175 may be an example of a bank of transistors (e.g., FET transistors) that may operate in a region, such as a linear region (e.g., the region between the power supply and the channel 190), among other examples.

In some examples, the DQ channel 190 or the DQ pins of the memory device 110 may be associated with a defect—e.g., there may be an electrical short or a wiring may be faulty, among other example. In such examples, the DQ channel 190 may be terminated to a ground voltage. In other examples, the memory device 110 may communicate a logic state zero (0) associated with a bit of data requested by the host device 105 (e.g., based on a command from the host device 105). In such examples, the memory device 110 may drive the DQ channel 190 to the ground voltage to communicate the logic state zero (0). In some cases, the host device 105 may be unable to determine if the memory device 110 is associated with a defect or if the memory device 110 is communicating the logic state zero (0). This may cause the FIT of the system 100 to increase beyond an accepted level, for example, related to industry standards or specifications.

As described herein, the resistive component 175 may pull up the voltage of DQ channel 190 to a voltage higher than the ground voltage when there is absence of data being communicated over the DQ channel 190. That is, when the DQ channel 190 is not being driven to a voltage by the memory device 110 to communicate data, the resistive component 175 may cause the DQ channel 190 to float at the voltage relatively higher than ground. In such examples, the host device 105 may determine whether the memory device 110 is communicating data or if the memory device 110 is associated with a defect. By enabling the host device 105 to differentiate between the defect and data being driven, the FIT of the system 100 may be reduced, among other advantages.

Figure 2:
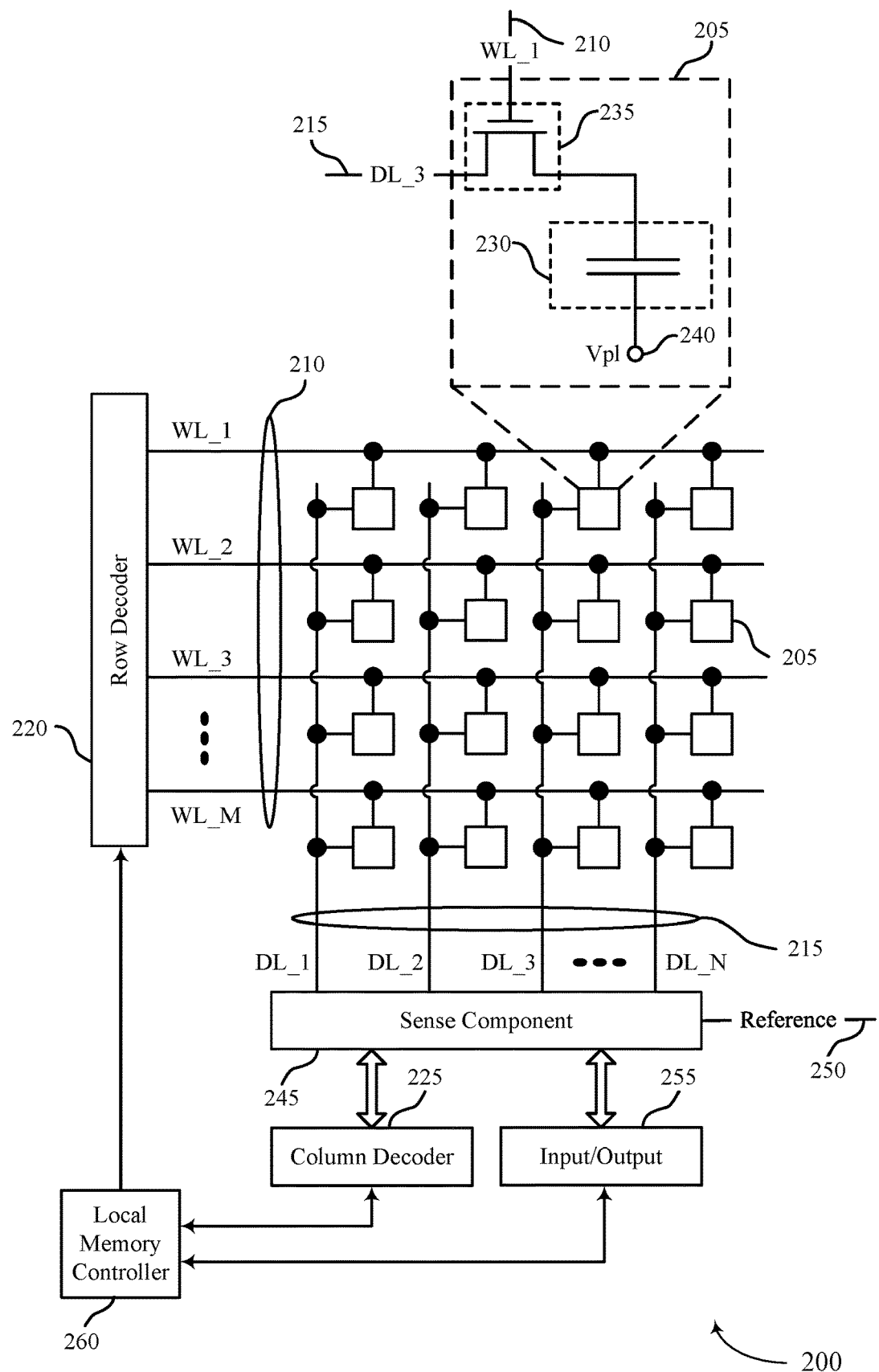
FIG. 2 illustrates an example of a memory die that supports memory bus drive defect detection in accordance with examples as disclosed herein.

FIG. 2 illustrates an example of a memory die 200 that supports memory bus drive defect detection in accordance with examples as disclosed herein. The memory die 200 may be an example of the memory dice 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

In some examples, the memory die 200 may communicate the data stored at the memory cells 205 to a host device (e.g., a host device 1105 as described with reference to FIG. 1). In some cases, the memory die 200 may drive a bus coupled with the memory die 200 and the host device to a voltage associated with the logic state stored at the memory cell 205—e.g., the memory die 200 may drive the bus to a ground voltage when communicating the logic state zero (0). In some instances, there may be a defect associated with the bus. In such examples, the bus may be terminated to a ground voltage. In some instances, the host device may be unable to determine if the memory die 200 is communicating a logic state zero (0) or if there is a defect associated with the memory die 200. This may cause the FIT of the memory die 200 to increase.

As described herein, a resistive component may be coupled with the bus and a power supply of the memory die 200 and may cause the bus to operate in a first state. That is, the resistive component may pull up a voltage of the bus to a voltage higher than the ground voltage when there is absence of data being communicated over the bus. For example, when the bus is not being driven to a voltage by the memory die 200 to communicate data, the resistive component may cause the bus to float at the voltage relatively higher than ground. In such examples, the host device may determine whether the memory die 200 is communicating data or if the memory die 200 is associated with a defect. By enabling the host device to differentiate between the defect and data being driven, the FIT of the memory die 200 may be reduced, among other advantages.

Figure 3:
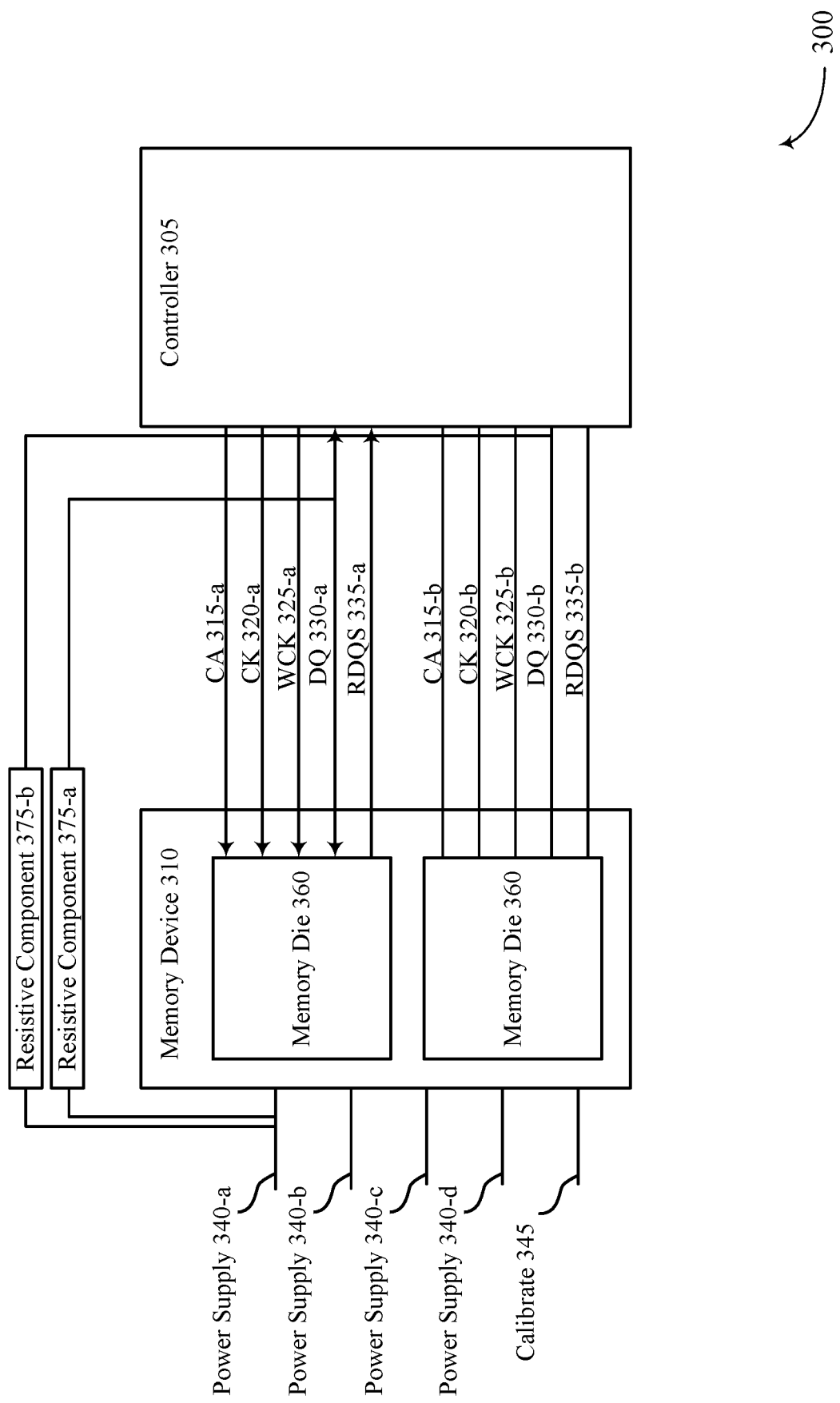
FIG. 3 illustrates an example of a system that supports memory bus drive defect detection in accordance with examples as disclosed herein.

FIG. 3 illustrates an example of a system 300 that supports memory bus drive defect detection in accordance with examples as disclosed herein. The system 300 may include a controller 305 and a memory device 310. The memory device 310 may be an example of memory device 110 as described with reference to FIG. 1. The memory device 310 may include memory die 360-*a* and memory die 360-*b*. The memory die 360 may be examples of memory die 160 as described with reference to FIG. 1. In some examples, the memory device 310 may include more than, equal to, or less than two memory dice 360. That is, two memory dice 360 are shown for illustrative purposes only and are not limiting to the present disclosure. The system 300 may also include power supply lines 340 (e.g., power supplies 340) and a calibrate line 345. Each memory die 360 may be coupled with the controller 305 over various buses or channels that may include CA bus 315, CK bus 320, WCK bus 325, DQ bus 330, and RDQS bus 335. CA bus 315 may be an example of CA bus 186, CK bus 320 may be an example of CK bus 188, DQ bus 330 may be an example of DQ bus 190 as described with reference to FIG. 1, respectively. System 300 may also include resistive components 375 (e.g., resistive component 375-*a*, resistive components 375-*b*) coupled between the power supply line 340-*a* and a respective DQ bus 330 bus. Resistive component 375 (e.g., resistive component 375-*a*, resistive component 375-*b*) may be an example of resistive component 175 as described with reference to FIG. 1.

The controller 305 may be configured to transmit commands (e.g., access commands such as read, write, and refresh commands) to the memory device 310. For example, the controller 305 may be part of a host device (e.g., similar to external memory controller 120 referenced with respect to FIG. 1) and may transmit a command to request data from the memory device 310 or transmit a command for data to be written to the memory device 310. In some examples, the controller 305 may be associated with a host device (e.g., host device 105 as described with reference to FIG. 1) as discussed herein. In other examples, the controller 305 may be a controller of the memory device 310 (e.g., similar to a local memory controller 165 referenced with respect to FIG. 1). That is, the system 300 may be an example of a memory device that includes the memory die 360 and the controller 305, and the controller 305 may be coupled with a host device (not shown) via one or more buses. The controller 305 may be configured to detect a state of the DQ bus 330 after sending a command to the memory device 310.

The memory device 310 may be configured to store data for the controller 305 at the memory die 360. In some examples, the memory device 310 may be in an automotive system. In such examples, the memory device 310 may store data for electrical systems or subsystems of the automotive system. Examples of electrical systems or subsystems include a power train control unit, a human-machine interface control unit, a door control unit, different types of engine control units, seat control unit, speed control unit, telematic control unit, transmission control unit, brake control unit, battery management control unit, or others, or a combination thereof. The memory die 360 may be configured to store a data bit as a logic state zero (0) or a logic state one (1), among other examples, including examples with more than two states. In some examples, the memory device 310 may be configured to drive the DQ bus 330 to a ground voltage when communicating the logic state (0) and drive the DQ bus 330 to a relatively high voltage when communicating the logic state one (1) in response to a command received from the controller 305—e.g., when transmitting data to the controller 305.

The CA bus 315-a may be configured to transmit commands or memory addresses from the controller 305 to the memory dice 360. For example, the CA bus 315 may be configured to transmit read commands, write commands, refresh commands, and other commands. In some examples, the CA bus 315 may be configured to transmit memory addresses associated with a location of the data requested in the command generated by the controller 305. The CK bus 320-a may be configured to transmit clock signals from the controller 305 to the memory dice 360. In some cases, the WCK bus 325 may be configured to transmit system clock signals from the controller 305 to memory dice 360. The CK bus 320 and WCK bus 325 may communicate clock signals that provide a timing reference for the command and addressing operations specified in the command transmitted by the controller 305. In some examples, the DQ bus 330 may be configured to communicate data between the memory device 310 and the controller 305. For example, the DQ bus 330 may communicate a bit of data as a logic state (0) or a logic state one (1) to and from the memory device 310. The RDQS bus 335 may be configured to communicate a data strobe signal from the memory dice 360 to the controller 305. For example, the RDQS bus 335 may communicate a read data strobe signal to the controller 305 from the memory device 310.

The power supply lines 340 may be configured to power the memory device 310. In some examples, each power supply line 340 may be associated with a different voltage. For example, power supply line 340-a may be associated with a VCC voltage. In other examples, the power supply line 340-d may be associated with a ground voltage. Calibrate line 345 may be configured to help calibrate the memory device 310. For example, calibrate line 345 may be associated with a voltage utilized to calibrate the DQ pins of the memory device 310. That is, the calibrate line 345 may calibrate the read DQ operation of the memory device 310. In some examples, the system 300 may have more than or less than four power supply lines 340.

The resistive component 375 may be configured to cause a respective bus (e.g. DQ bus 330-a and DQ bus 330-b) that communicates data to and from the memory device 310 to operate in a first state that has a voltage relatively higher than a ground voltage and lower than a voltage associated with the bus communicating a logic state one (1) when there is an absence of information communicated on the respective bus. For example, the resistive component 375-a may be configured to cause the DQ bus 330-a to operate in the first state when there is an absence of data being communicated on the DQ bus 330-a. In some examples, the first state may be associated with a floating state. That is, the floating state may occur when a voltage is not being applied to the DQ 330—e.g., when there is an absence of data being communicated over the DQ bus 330, there may be an absence of a voltage being applied to the DQ bus 330 and the DQ bus 330 may be considered in a floating state. The DQ bus 330 may be in the first state when the resistive component 375 pulls up the voltage of the DQ bus 330 from the ground voltage. In some examples, the voltage pull up of the resistive component 375 may be a relatively weak voltage and the DQ bus 330 may be driven to the ground voltage or the voltage associated with a logic state one (1) without much additional power consumption. In some examples, the resistive component 375 may be an example of a resistor. In other examples, the resistive component 375 may be any component having a resistive value configured to pull up the voltage of the respective DQ bus 330 relative to a second state (e.g., a ground state, a value corresponding to another lower state). For example, the resistive component 375 may be a bank of FET transistors operating in a linear region (e.g., the region between the power supply lines 340 and the DQ bus 330-a). Although resistive components 375 are shown coupled to power supply line 340-a, in other examples resistive components 375 may be coupled with one or more different power supply lines 340, for example one or more different power supply lines 340 that may not be associated with ground—e.g., in examples where power supply line 340-d is a ground voltage—resistive components 375 may be coupled with one or more of the power supply lines 340-a through 340-c.

In some examples, the resistive component 375 may be coupled with a DQ pin of the memory device 310 (e.g., a DQ bus 330 coupled with a DQ pin of the memory device 310). In other examples the resistive component 375 (or some group of resistive components 375) may be coupled with multiple of or all of the DQ pins of the memory device 310 (collectively or individually/respectively). In some cases, the resistive component 375 may be coupled with a determined quantity of DQ pins, the determined quantity being between one and a total quantity of DQ pins (e.g., a subset of the total quantity of DQ pins). That is, although a single DQ bus 330 is shown coupled between a memory die 360 and the controller 305, in some examples there may be multiple DQ buses 330 coupled between the memory device 310 and the controller 305—e.g., one DQ bus 330 for each DQ pin of the memory die 360. For example, each memory die 360 may have eight (8) DQ pins and there may be eight (8) buses represented by DQ bus 330-a in FIG. 3. In such examples, there may be eight (8) resistive components 375-a, one coupled with each DQ bus 330-a. In other examples, there may be less than eight (8) resistive components 375-*a*—e.g., there may be a single resistive component 375-*a* coupled with one (1) of the eight (8) DQ buses 330-*a* or any quantity of resistive components 375-*a* between two (2) and seven (7) coupled with the predetermined quantity of DQ buses 330-*a*.

In some examples, the memory device 310 may communicate data to, or from, or both the controller 305 in response to a command transmitted by the controller 305. In some cases, the memory device 310 may have a physical defect—e.g., a bond wiring may break, a short may occur in the memory device 310, a solder joint may break, etc. That is, the memory device 310 may experience a problem, such as for example a mechanical issue. In such examples, the DQ bus 330 may be terminated to a ground voltage. In some cases, the resistive component 375 may pull up the voltage of the DQ bus 330 to a voltage relatively higher than the ground voltage—e.g., to a first state. Accordingly, the controller 305 may determine that an error associated with the one or more DQ pins or the DQ bus 330 exists when the controller 305 detects the DQ bus 330 in the first state after the controller 305 transmits a command. That is, the controller 305 may determine the memory device 310 was unresponsive to the command transmitted by the controller 305 and therefore the memory device 310 is associated with a defect. By enabling the controller 305 to determine whether the DQ bus 330 or the one or more pins are defective or communicating data (e.g., by driving the DQ bus 330 to ground), the overall FIT of the memory device 310 may be reduced.

Figure 4:
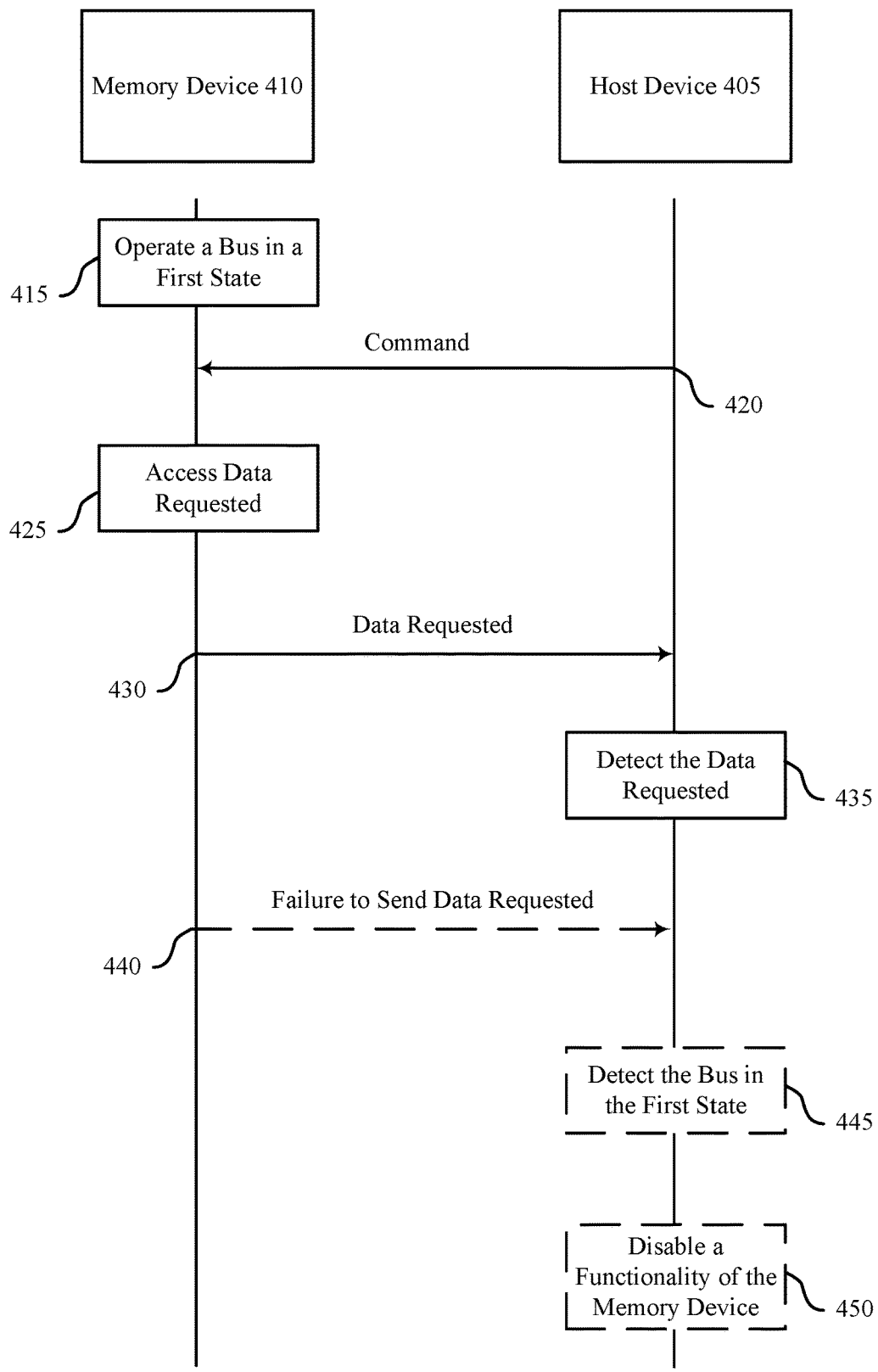
FIG. 4 illustrates an example of a process flow that supports memory bus drive defect detection in accordance with examples as disclosed herein.

FIG. 4 illustrates an example of a process flow 400 that supports memory bus drive defect detection in accordance with examples as disclosed herein. Process flow 400 may include a host device 405 and a memory device 410, which may be respective examples of a host device 105 and a memory device 110 as described with reference to FIG. 1. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. The process flow 400 illustrates examples for access control techniques for a memory device.

At 415, the memory device 410 may operate a bus in a first state. For example, the memory device may be coupled with the host device 405 via the bus. In some examples, the bus be a bus that communicates data between (to, or from, or both) the memory device 410 (e.g., DQ bus 330 as described with reference to FIG. 3). In some examples, a resistive component (e.g., resistive component 375 as described with reference to FIG. 3) may be coupled between the bus and a power supply of the memory device (e.g., power supply line 340 as described with reference to FIG. 3). In such examples, the bus may operate in a first state (e.g., a floating state as described with reference to FIG. 3) as the resistive component may pull up a voltage of the bus to a voltage relatively higher than a voltage of a second state (e.g., a state where the bus is at a ground voltage).

At 420, the host device 405 may transmit a command to the memory device 410. For example, the host device 405 may communicate a read command, a write command, or a refresh command—e.g., to write data to the memory device 410 or request data from the memory device 410. The host device 405 may also transmit a memory address associated with the data requested in the command.

At 425, the memory device 410 may access the data requested by the host device 405. For example, the memory device 410 may access a location indicated by the memory address received from the host device 405 to access the data requested by the host device 405. In some examples, the memory device 410 may access data from a memory die (e.g., memory die 160 as described with reference to FIG. 1) in response to the command communicated by the host device 405.

At 430, the memory device 410 may communicate the data requested to the host device 405. For example, the memory device 410 may drive the bus to a second state (e.g., a ground voltage) to communicate a logic state zero (0) to the host device 405. In other examples, the memory device may drive the bus to a third state (e.g., to a voltage relatively higher than the voltage of the bus in the first state) to communicate a logic state one (1) to the host device 405. In some examples, the memory device 410 may communicate the data via one or more DQ pins (e.g., DQ pins as described with reference to FIG. 3).

At 435, the host device 405 may detect the data requested from the memory device 410. For example, the host device 405 may communicate a data strobe signal over the DQ bus to determine the state of the bus. In some examples, the host device may detect the bus in the second state—e.g., the host device 405 may determine the memory device 410 communicated a logic state zero (0). In other examples, the host device may detect the bus in the third state—e.g., the host device 405 may determine the memory device 410 communicated a logic state one (1). In some examples, the host device 405 may then utilize the data requested to execute a task associated with the host device 405.

At 440, the memory device 410 may fail to communicate the data requested by the host device 405. That is, in some examples, a physical defect may be present in memory device 410 (e.g., a physical or mechanical defect as described with reference to FIG. 3). In such examples, the memory device 410 may access the data requested and attempt to communicate the data to the host device 405 via the one or more DQ pins and the bus. In examples where the memory device 410 includes a physical defect, the bus may be terminated to ground. That is, the memory device 410 may be unable to drive a voltage to the bus. Because the resistive component is coupled between the bus and the power supply, the bus may be in the first state—e.g., in a floating state. In some examples, the first state may be associated with a relatively weak high voltage. That is, it may be clear whether the bus is in the first state (e.g., floating), the second state (e.g., driven to ground), or the third state (e.g., driven to a relatively high voltage). Additionally or alternatively, the first state may be associated with an absence of data being communicated over the bus. In other examples, there may be a defect associated with a CA bus (e.g., the CA bus 315 as described with reference to FIG. 3). In such examples, the memory device 410 may be unable to receive the access command from the host device 405. Accordingly, the bus may remain in the first state described with reference to 415.

At 445, the host device 405 may detect the bus in the first state. For example, the host device 405 may detect the bus in the floating state at the relatively high and weak voltage. Because the first state is associated with an absence of data being communicated over the bus, the host device 405 may determine there is a defect associated with the memory device or the transmission of the access command—e.g., a defect associated with the one or more DQ pins or the bus. That is, the host device 405 may determine there is a defect associated with the memory device 410 due to a lack of a response to the command communicated by the host device 405. In some examples, the host device 405 may communicate a data strobe signal to detect the state of the bus. By allowing the host device 405 to determine whether the memory device 410 is associated with a defect or communicating data, the FIT of the memory device 410 may be reduced to acceptable levels—e.g., a system (e.g., system 100 as described with reference to FIG. 1) may experience fewer failures based on the host device 405 being able to detect when the memory device 410 is associated with an error.

At 450, the host device may disable a functionality of the memory device 410. For example, the host device 405 may transition the memory device 410 from a first state associated with communicating data to and from the host device 405 to a second state associated with disabling a functionality of the memory device 410. In some examples, the host device 405 may disable the functionality of the memory device 410 by placing the memory device 410 in a safe mode. The memory device 410 may be limited in communicating information to and from the host device 405 while in the second state. In such examples, the safety of the system may increase as the memory device 410 is limited while a defect is present in the memory device 410. Additionally or alternatively, by placing the memory device 410 in the second state, the host device 405 may quickly identify the memory device 410 is associated with a defect and refrain from communicating additional commands until the defect is resolved. In some examples, the host device 405 may transition the memory device 410 from the second state back to the first state when the defect is resolved—e.g., the host device 405 may re-enable the full functionality of the memory device 410 when the defect is resolved.

Figure 5:
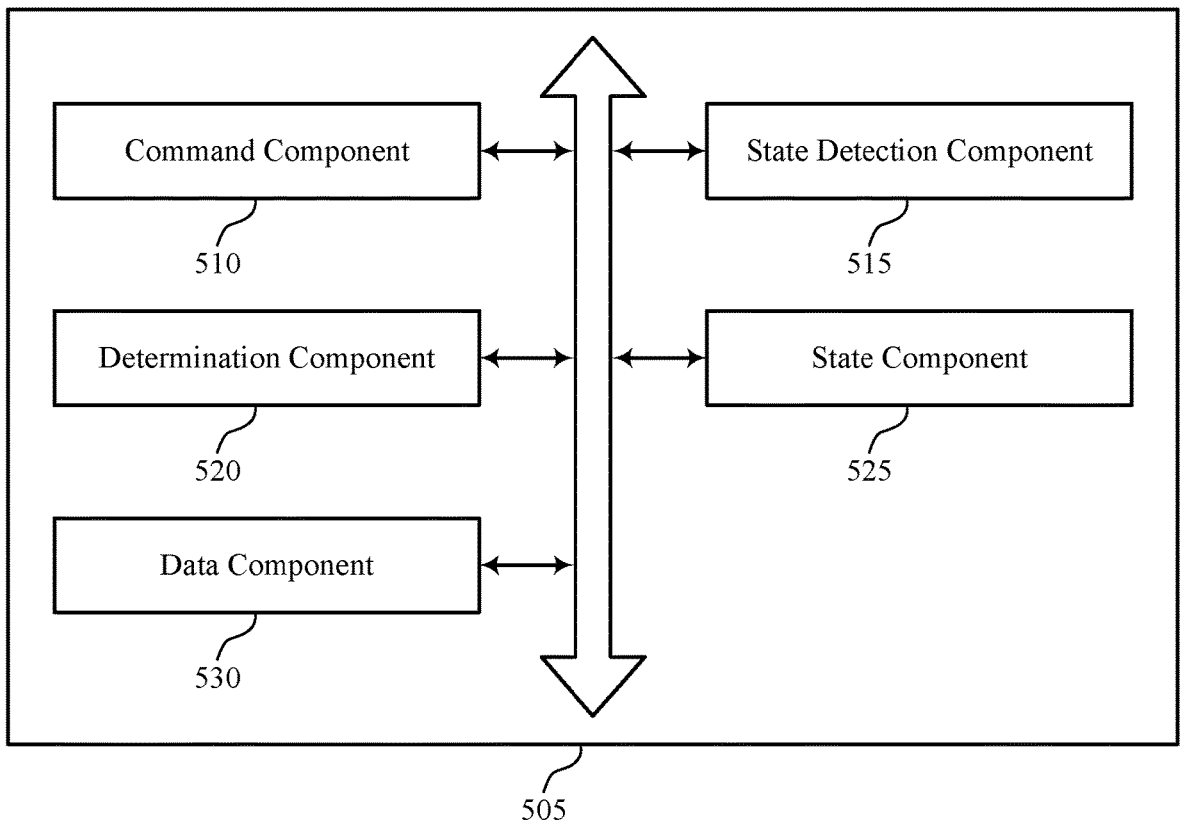
FIG. 5 shows a block diagram of a memory device that supports memory bus drive defect detection in accordance with examples as disclosed herein.

FIG. 5 shows a block diagram 500 of a memory device 505 that supports memory bus drive defect detection in accordance with examples as disclosed herein. The memory device 505 may be an example of aspects of a memory device as described with reference to FIGS. 1-4. The memory device 505 may include a command component 510, a state detection component 515, a determination component 520, a state component 525, and a data component 530. Each of these modules may communicate, directly or indirectly, with one another (e.g., via one or more buses).

The command component 510 may receive, at a controller coupled with a memory array, a command for data, the memory array including one or more pins for communicating data to and from the memory array in response to the command received. In some examples, the command component 510 may transmit, from the controller to the memory array over a bus that is coupled with the controller and the one or more pins, the command for the data. In some cases, the command component 510 may receive, at the controller, a second command for a second data. In some instances, the command component 510 may transmit, to the memory array over the bus, the second command for the second data.

The state detection component 515 may detect, at the controller and based on a resistor coupled with the bus and a power supply of the memory array, that the bus is operating in a first state after transmitting the command for the data, the first state including a voltage that is relatively higher than a voltage of a second state. In some examples, the state detection component 515 may detect, at the controller, that the bus is in the second state or a third state after transmitting the second command for the second data, the third state including a voltage that is relatively higher than the voltage of the first state. In some cases, the state detection component 515 may determine an absence of the defect associated with one or both of the bus or the one or more pins based on detecting that the bus in the second state or the third state. In some instances, the state detection component 515 may detect that the first state is associated with an absence of data being communicated over the bus. In some examples, the state detection component 515 may detect that the second state is associated with a first logic value of a bit in the second data. In some cases, the state detection component 515 may detect that the third state is associated with a second logic value of a second bit in the second data. In some instances, the state detection component 515 may detect that the first state includes an absence of a voltage being applied to the bus.

The determination component 520 may determine a defect associated with one or both of the bus or the one or more pins based on the detecting that the bus is in the first state.

The state component 525 may transition the memory array from a first state associated with communicating information to a second state associated with disabling a functionality of the memory array based on determining the defect.

The data component 530 may receive, at the controller from the memory array, the second data based on transmitting the second command and determining the absence of the defect.

In some examples, the data component 530 may communicate a strobe signal over the bus after transmitting the command for the data, where detecting the first state is based on communicating the strobe signal.

Figure 6:
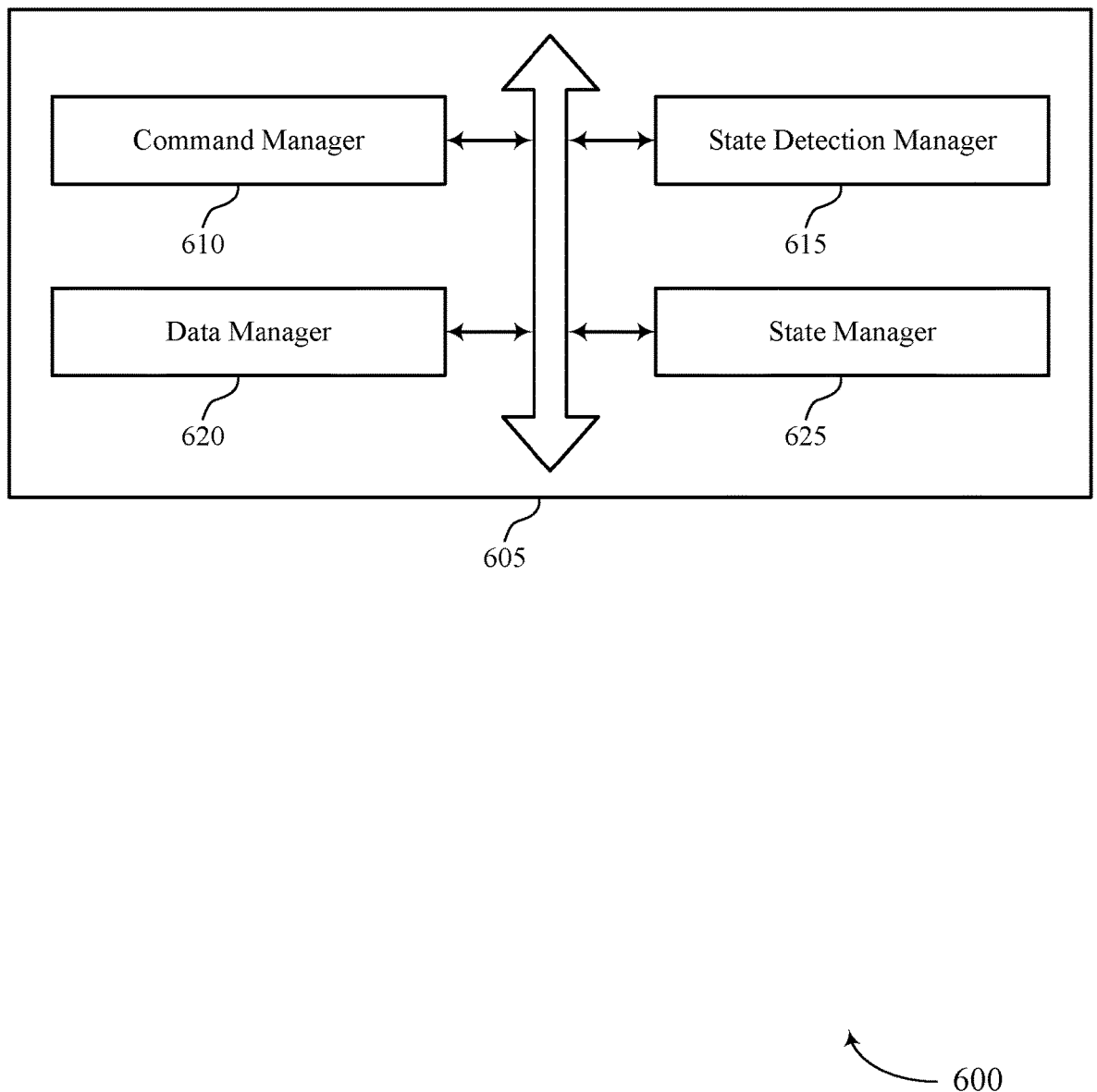
FIG. 6 shows a block diagram of a host device that supports memory bus drive defect detection in accordance with examples as disclosed herein.

FIG. 6 shows a block diagram 600 of a host device 605 that supports memory bus drive defect detection in accordance with examples as disclosed herein. The host device 605 may be an example of aspects of a host device as described with reference to FIGS. 1-5. The host device 605 may include a command manager 610, a state detection manager 615, a data manager 620, and a state manager 625. Each of these modules may communicate, directly or indirectly, with one another (e.g., via one or more buses).

The command manager 610 may transmit, from a host device over a bus coupled with the host device, a command for data. In some examples, the command manager 610 may transmit, from the host device over the bus, a second command for second data.

The state detection manager 615 may detect that the bus is operating in a first state based on transmitting the command, the first state including a voltage that is relatively higher than a voltage of a second state. In some examples, the state detection manager 615 may determine an error associated with the transmission of the command for the data based on detecting that the bus is in the first state. In some cases, the state detection manager 615 may detect that the bus is in the second state based on transmitting the second command. In some instances, the state detection manager 615 may determine an absence of the error associated with the transmission of the second command for the second data based on detecting that the bus is in the second state. In some cases, state detection manager 615 may determine that the bus is in the first state based on a resistor coupled with the bus and with a power supply of a memory device coupled with the host device.

The data manager 620 may receive, at the host device, the second data based on transmitting the second command and detecting the bus in the second state.

The state manager 625 may transition a memory device coupled with the bus from a first state associated with communicating information to a second state associated with disabling a functionality of the memory device based on determining the error.

Figure 7:
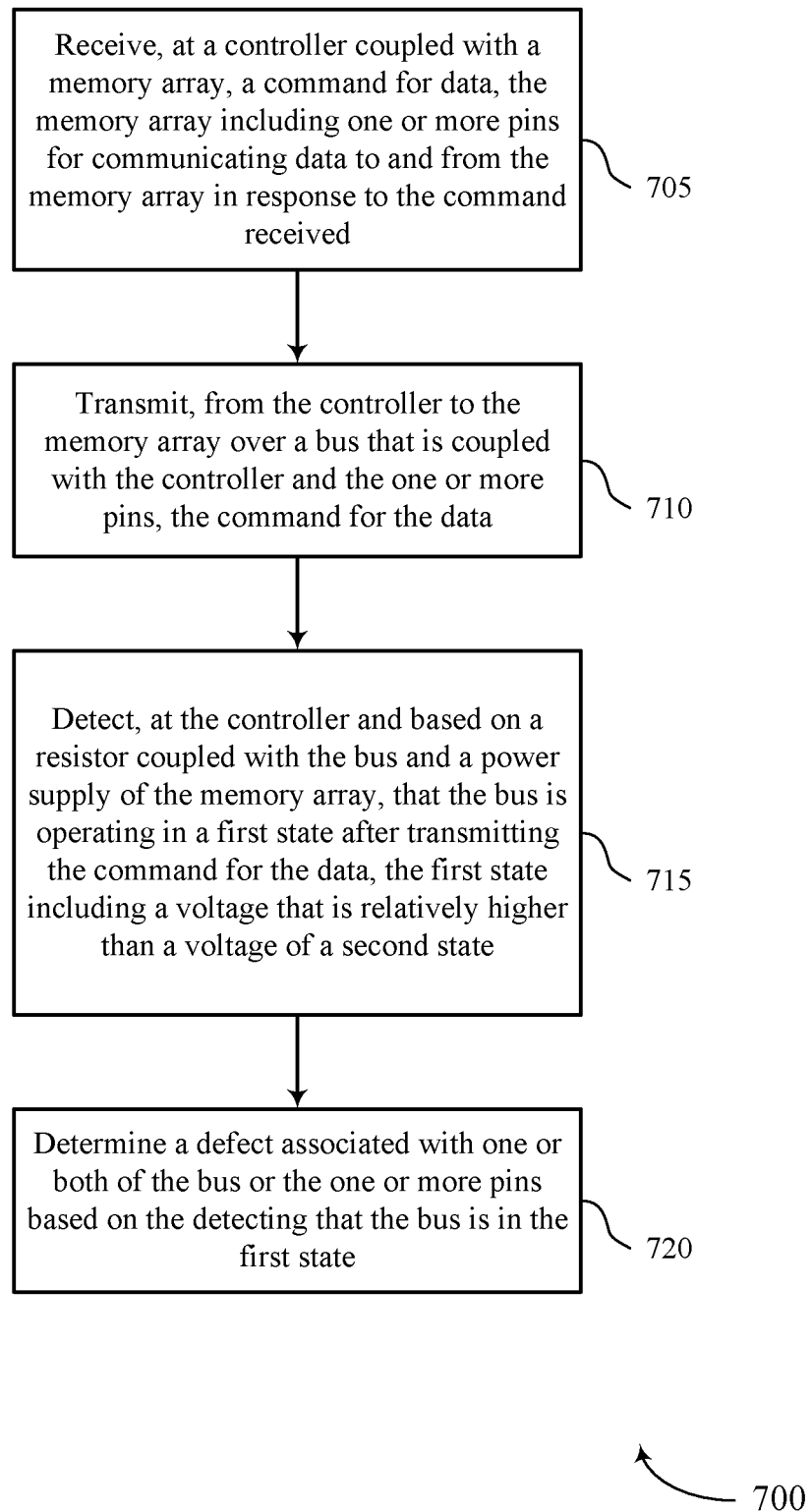
FIGS. 7 through 9 show flowcharts illustrating a method or methods that support memory bus drive defect detection in accordance with examples as disclosed herein.

FIG. 7 shows a flowchart illustrating a method or methods 700 that supports memory bus drive defect detection in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may receive, at a controller coupled with a memory array, a command for data, the memory array including one or more pins for communicating data to and from the memory array in response to the command received. The operations of 705 may be performed according to the methods with reference to FIGS. 3 and 4. In some examples, aspects of the operations of 705 may be performed by a command component as described with reference to FIG. 5.

At 710, the memory device may transmit, from the controller to the memory array over a bus that is coupled with the controller and the one or more pins, the command for the data. The operations of 710 may be performed according to the methods with reference to FIGS. 3 and 4. In some examples, aspects of the operations of 710 may be performed by a command component as described with reference to FIG. 5.

At 715, the memory device may detect, at the controller and based on a resistor coupled with the bus and a power supply of the memory array, that the bus is operating in a first state after transmitting the command for the data, the first state including a voltage that is relatively higher than a voltage of a second state. The operations of 715 may be performed according to the methods with reference to FIGS. 3 and 4. In some examples, aspects of the operations of 715 may be performed by a state detection component as described with reference to FIG. 5.

At 720, the memory device may determine a defect associated with one or both of the bus or the one or more pins based on the detecting that the bus is in the first state. The operations of 720 may be performed according to the methods with reference to FIGS. 3 and 4. In some examples, aspects of the operations of 720 may be performed by a determination component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for receiving, at a controller coupled with a memory array, a command for data, the memory array including one or more pins for communicating data to and from the memory array in response to the command received, transmitting, from the controller to the memory array over a bus that is coupled with the controller and the one or more pins, the command for the data, detecting, at the controller and based on a resistor coupled with the bus and a power supply of the memory array, that the bus is operating in a first state after transmitting the command for the data, the first state including a voltage that is relatively higher than a voltage of a second state, and determining a defect associated with one or both of the bus or the one or more pins based on the detecting that the bus is in the first state.

Some cases of the method 700 and the apparatus described herein may further include operations, features, means, or instructions for transitioning the memory array from a first state associated with communicating information to a second state associated with disabling a functionality of the memory array based on determining the defect.

Some instances of the method 700 and the apparatus described herein may further include operations, features, means, or instructions for receiving, at the controller, a second command for a second data, transmitting, to the memory array over the bus, the second command for the second data, detecting, at the controller, that the bus may be in the second state or a third state after transmitting the second command for the second data, the third state including a voltage that may be relatively higher than the voltage of the first state, and determining an absence of the defect associated with one or both of the bus or the one or more pins based on detecting that the bus in the second state or the third state.

Some examples of the method 700 and the apparatus described herein may further include operations, features, means, or instructions for receiving, at the controller from the memory array, the second data based on transmitting the second command and determining the absence of the defect.

In some instances of the method 700 and the apparatus described herein, the first state may be associated with an absence of data being communicated over the bus, the second state may be associated with a first logic value of a bit in the second data, and the third state may be associated with a second logic value of a second bit in the second data.

Some examples of the method 700 and the apparatus described herein may further include operations, features, means, or instructions for communicating a strobe signal over the bus after transmitting the command for the data, where detecting the first state may be based on communicating the strobe signal.

In some cases of the method 700 and the apparatus described herein, the first state includes an absence of a voltage being applied to the bus.

Figure 8:
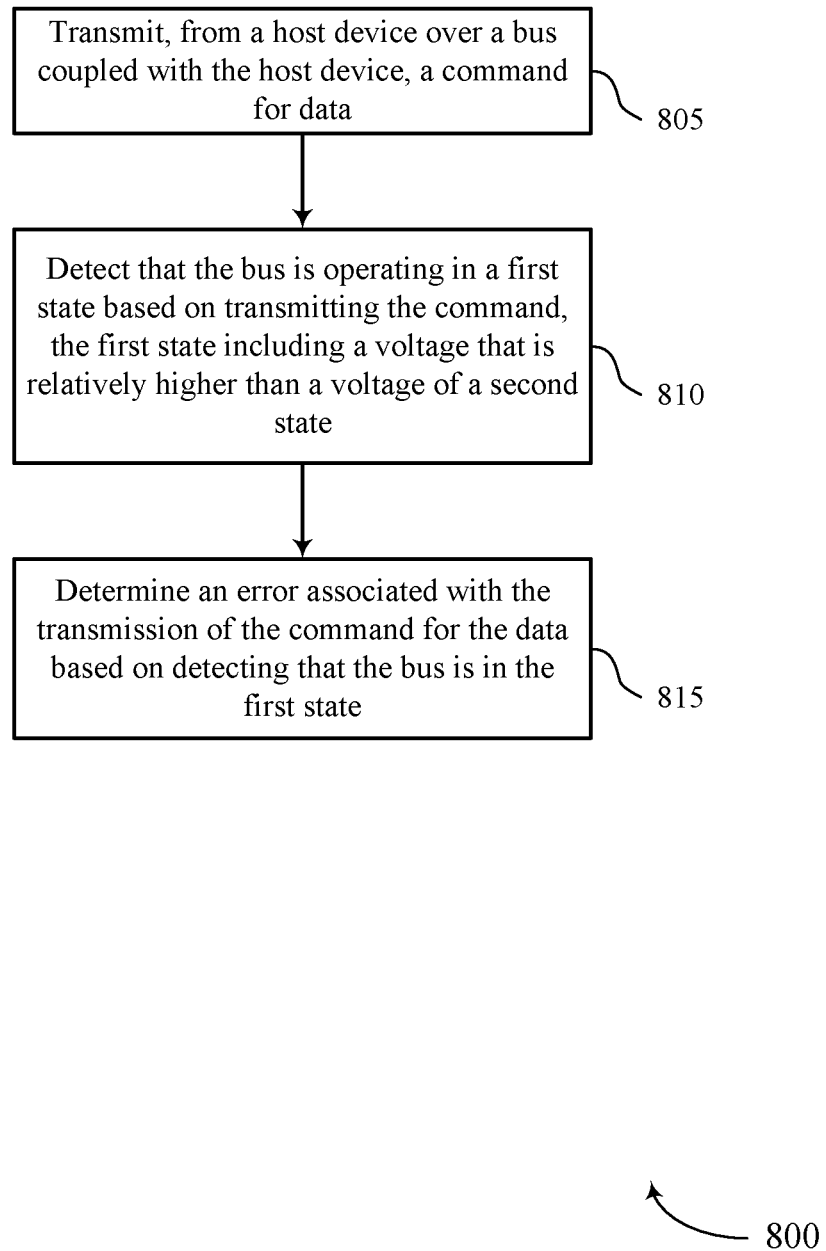

FIG. 8 shows a flowchart illustrating a method or methods 800 that supports memory bus drive defect detection in accordance with aspects of the present disclosure. The operations of method 800 may be implemented by a host device or its components as described herein. For example, the operations of method 800 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 805, the host device may transmit, from a host device over a bus coupled with the host device, a command for data. The operations of 805 may be performed according to the methods with reference to FIGS. 3 and 4. In some examples, aspects of the operations of 805 may be performed by a command manager as described with reference to FIG. 6.

At 810, the host device may detect that the bus is operating in a first state based on transmitting the command, the first state including a voltage that is relatively higher than a voltage of a second state. The operations of 810 may be performed according to the methods with reference to FIGS.

3 and 4. In some examples, aspects of the operations of 810 may be performed by a state detection manager as described with reference to FIG. 6.

At 815, the host device may determine an error associated with the transmission of the command for the data based on detecting that the bus is in the first state. The operations of 815 may be performed according to the methods with reference to FIGS. 3 and 4. In some examples, aspects of the operations of 815 may be performed by a state detection manager as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for transmitting, from a host device over a bus coupled with the host device, a command for data, detecting that the bus is operating in a first state based on transmitting the command, the first state including a voltage that is relatively higher than a voltage of a second state, and determining an error associated with the transmission of the command for the data based on detecting that the bus is in the first state.

Some cases of the method 800 and the apparatus described herein may further include operations, features, means, or instructions for transmitting, from the host device over the bus, a second command for second data, detecting that the bus may be in the second state based on transmitting the second command, determining an absence of the error associated with the transmission of the second command for the second data based on detecting that the bus may be in the second state, and receiving, at the host device, the second data based on transmitting the second command and detecting the bus in the second state.

In some instances of the method 800 and the apparatus described herein, the bus may be in the first state based on a resistor coupled with the bus and with a power supply of a memory device coupled with the host device.

Some examples of the method 800 and the apparatus described herein may further include operations, features, means, or instructions for transitioning a memory device coupled with the bus from a first state associated with communicating information to a second state associated with disabling a functionality of the memory device based on determining the error.

Figure 9:
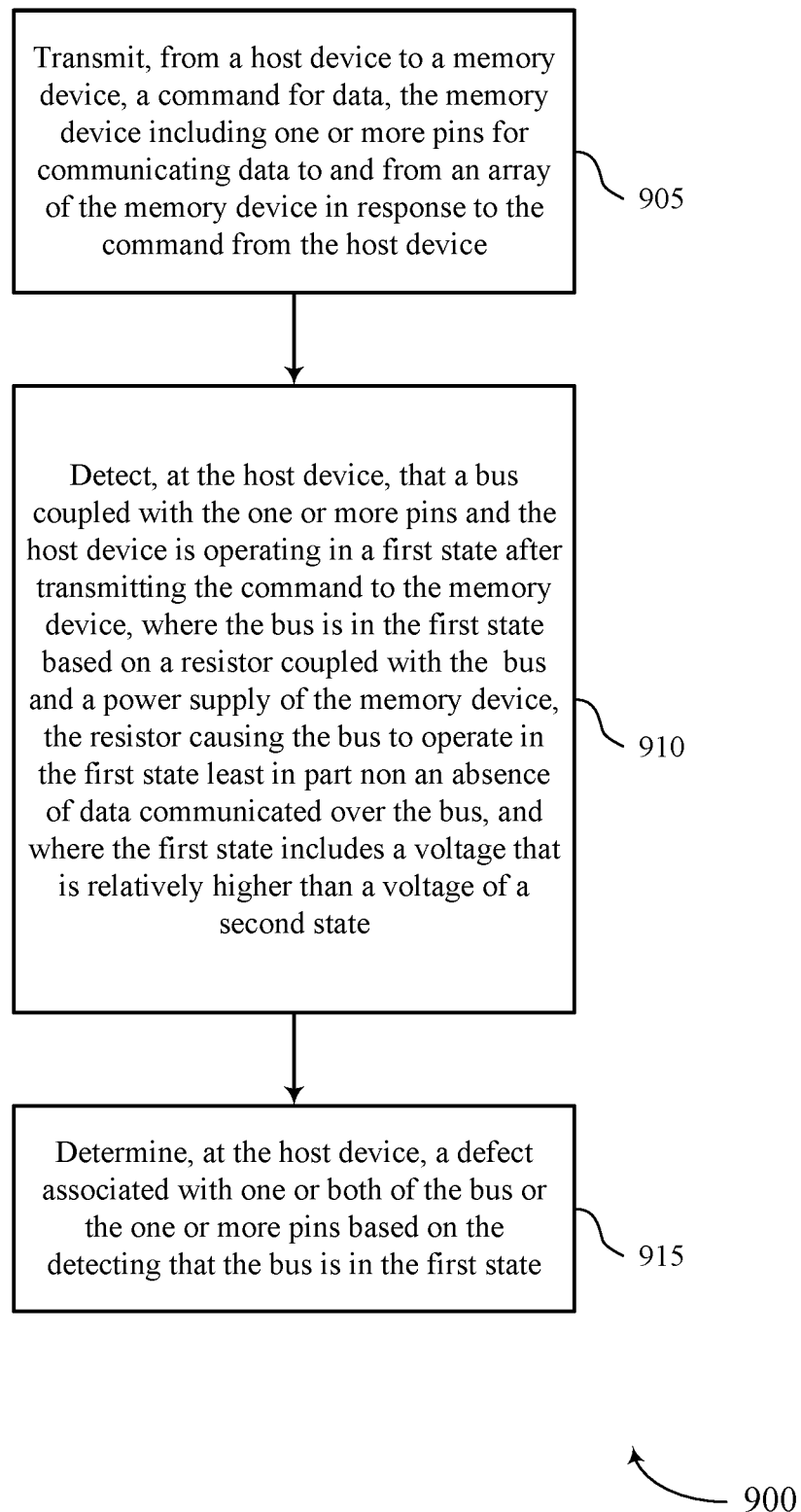

FIG. 9 shows a flowchart illustrating a method or methods 900 that supports memory bus drive defect detection in accordance with aspects of the present disclosure. The operations of method 900 may be implemented by a system or its components as described herein. For example, the operations of method 900 may be performed by a system as described with reference to FIG. 3. In some examples, a system may execute a set of instructions to control the functional elements of the system to perform the described functions. Additionally or alternatively, a system may perform aspects of the described functions using special-purpose hardware.

At 905, the system may transmit, from a host device to a memory device, a command for data, the memory device including one or more pins for communicating data to and from an array of the memory device in response to the command from the host device. The operations of 905 may be performed according to the methods with reference to FIGS. 3 and 4. In some examples, aspects of the operations of 905 may be performed by a system as described with reference to FIG. 3.

At 910, the system may detect, at the host device, that a bus coupled with the one or more pins and the host device is operating in a first state after transmitting the command to the memory device, where the bus is in the first state based on a resistor coupled with the bus and a power supply of the memory device, the resistor causing the bus to operate in the first state least in part non an absence of data communicated over the bus, and where the first state includes a voltage that is relatively higher than a voltage of a second state. The operations of 910 may be performed according to the methods with reference to FIGS. 3 and 4. In some examples, aspects of the operations of 910 may be performed by a system as described with reference to FIG. 3.

At 915, the system may determine, at the host device, a defect associated with one or both of the bus or the one or more pins based on the detecting that the bus is in the first state. The operations of 915 may be performed according to the methods with reference to FIGS. 3 and 4. In some examples, aspects of the operations of 915 may be performed by a system as described with reference to FIG. 3.

In some examples, an apparatus as described herein may perform a method or methods, such as the method 900. The apparatus may include features, means, or instructions (e.g., a non-transitory computer-readable medium storing instructions executable by a processor) for transmitting, from a host device to a memory device, a command for data, the memory device including one or more pins for communicating data to and from an array of the memory device in response to the command from the host device, detecting, at the host device, that a bus coupled with the one or more pins and the host device is operating in a first state after transmitting the command to the memory device, where the bus is in the first state based on a resistor coupled with the bus and a power supply of the memory device, the resistor causing the bus to operate in the first state least in part non an absence of data communicated over the bus, and where the first state includes a voltage that is relatively higher than a voltage of a second state, and determining, at the host device, a defect associated with one or both of the bus or the one or more pins based on the detecting that the bus is in the first state.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory device including one or more pins that are configured to communicate data to and from an array of the memory device in response to a command received at the memory device, a bus coupled with the one or more pins and configured to communicate data with the one or more pins in response to the command, and a resistor coupled with the bus and a power supply of the memory device and configured to cause the bus to operate in a first state based on an absence of data communicated over the bus, the first state including a voltage that is relatively higher than a voltage of a second state.

Some examples of the apparatus may include a host device coupled with the memory device, the host device configured to communicate the command to the memory device. In some instances, the host device may be configured to determine a defect associated with one or both of the bus or the one or more pins based on detecting that the bus may be in the first state after communicating the command. In some cases, the memory device may be configured to drive the bus to the second state based on communicating data in response to the command.

In some examples, the memory device may be configured to drive the bus to a third state based on communicating data in response to the command, the third state including a voltage that may be relatively higher than the voltage of the first state after receiving the response. Some instances of the apparatus may include a set of buses coupled with the one or more pins and configured to communicate data to and from the array of the memory device in response to the command received at the memory device, the set of buses including the bus, and a set of resistors, each resistor of the set of resistors coupled with a respective bus of the set of buses and the power supply, and configured to cause the respective bus to operate in the first state based on an absence of data for communication over the respective bus, the set of resistors including the resistor.

Some cases of the apparatus may include a set of buses coupled with the one or more pins and configured to communicate data to and from the array of the memory device in response to a command received at the memory device, the set of buses including the bus, and a set of resistors, each resistor of the set of resistors coupled with a respective bus of a first quantity of buses of the set of buses and the power supply and configured to cause the respective bus to operate in the first state based on an absence of data for communication over the respective bus, the first quantity of buses less than all the set of buses and the set of resistors including the resistor.

Some instances of the apparatus may include a set of power supplies coupled with the memory device and configured to power the memory device, the set of power supplies including the power supply. Some examples of the apparatus may include a second bus coupled with the one or more pins and configured to communicate data with the one or more pins in response to the command, and a second resistor coupled with the second bus and a second power supply of the set of power supplies, and configured to cause the second bus to operate in the first state based on an absence of data communicated over the second bus.

An apparatus is described. The apparatus may include a memory array including one or more pins for communicating data to and from the memory array, a controller coupled with the memory array and configured to, transmit, to the memory array over a bus that is coupled with the controller and the one or more pins of the memory array, the command for the data, detect, based on a resistor coupled with the bus and a power supply of the memory array, that the bus is in a first state after transmitting the command for the data, the first state including a voltage that is relatively higher than a voltage of a second state, and determine a defect associated with one or both of the bus or the one or more pins based on the detecting that the bus is in the first state.

In some cases, the controller may be further configured to transition the memory array from a first state associated with communicating information to a second state associated with disabling a functionality of the memory array based on determining the defect.

In some examples, the controller may be further configured to receive a second command for a second data, transmit, to the memory array over the bus, the second command for the second data, detect that the bus may be in the second state or a third state after transmitting the second command for the second data, the third state including a voltage that may be relatively higher than the voltage of the first state, and determine an absence of the defect associated with one or both of the bus or the one or more pins based on detecting that the bus in the second state or third state.

In some instances, the controller may be further configured to receiving from the memory array the second data based on transmitting the second command and determining the absence of the defect. In some examples, the first state may be associated with an absence of data being communicated over the bus, the second state may be associated with a first logic value of a bit in the second data, and the third state may be associated with a second logic value of a second bit in the second data.

In some cases, the controller may be further configured to communicate a strobe signal over the bus after transmitting the command for the data, where the controller may be configured to detect the first state based on communicating the strobe signal.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a memory device comprising one or more pins that are configured to communicate data to and from an array of the memory device in response to a command received at the memory device;
   a bus coupled with the one or more pins and configured to communicate data with the one or more pins in response to the command; and
   a resistor coupled with the bus and a power supply of the memory device and configured to cause the bus to operate in a first state based at least in part on an absence of data communicated over the bus, the first state comprising a voltage that is relatively higher than a voltage of a second state.

2. The apparatus of claim 1, further comprising:
   a host device coupled with the memory device, the host device configured to communicate the command to the memory device.

3. The apparatus of claim 2, wherein the host device is configured to determine a defect associated with one or both of the bus or the one or more pins based at least in part on detecting that the bus is in the first state after communicating the command.

4. The apparatus of claim 1, wherein the memory device is configured to drive the bus to the second state based at least in part on communicating data in response to the command.

5. The apparatus of claim 1, wherein the memory device is configured to drive the bus to a third state based at least in part on communicating data in response to the command, the third state comprising a voltage that is relatively higher than the voltage of the first state after receiving the response.

6. The apparatus of claim 1, further comprising:
a plurality of buses coupled with the one or more pins and configured to communicate data to and from the array of the memory device in response to the command received at the memory device, the plurality of buses comprising the bus; and
a plurality of resistors, each resistor of the plurality of resistors coupled with a respective bus of the plurality of buses and the power supply, and configured to cause the respective bus to operate in the first state based at least in part on an absence of data for communication over the respective bus, the plurality of resistors comprising the resistor.

7. The apparatus of claim 1, further comprising:
a plurality of buses coupled with the one or more pins and configured to communicate data to and from the array of the memory device in response to the command received at the memory device, the plurality of buses comprising the bus; and
a plurality of resistors, each resistor of the plurality of resistors coupled with a respective bus of a first quantity of buses of the plurality of buses and the power supply and configured to cause the respective bus to operate in the first state based at least in part on an absence of data for communication over the respective bus, the first quantity of buses less than all the plurality of buses and the plurality of resistors comprising the resistor.

8. The apparatus of claim 1, further comprising:
a plurality of power supplies coupled with the memory device and configured to power the memory device, the plurality of power supplies comprising the power supply.

9. The apparatus of claim 8, further comprising:
a second bus coupled with the one or more pins and configured to communicate data with the one or more pins in response to the command; and
a second resistor coupled with the second bus and a second power supply of the plurality of power supplies, and configured to cause the second bus to operate in the first state based at least in part on an absence of data communicated over the second bus.

10. A method, comprising:
receiving, at a controller coupled with a memory array, a command for data, the memory array comprising one or more pins for communicating data to and from the memory array in response to the command received;
transmitting, from the controller to the memory array over a bus that is coupled with the controller and the one or more pins, the command for the data;
detecting, at the controller and based at least in part on a resistor coupled with the bus and a power supply of the memory array, that the bus is operating in a first state after transmitting the command for the data, the first state comprising a voltage that is relatively higher than a voltage of a second state; and
determining a defect associated with one or both of the bus or the one or more pins based at least in part on the detecting that the bus is in the first state.

11. The method of claim 10, further comprising:
transitioning the memory array from a first state associated with communicating information to a second state associated with disabling a functionality of the memory array based at least in part on determining the defect.

12. The method of claim 10, further comprising:
receiving, at the controller, a second command for a second data;
transmitting, to the memory array over the bus, the second command for the second data;
detecting, at the controller, that the bus is in the second state or a third state after transmitting the second command for the second data, the third state comprising a voltage that is relatively higher than the voltage of the first state; and
determining an absence of the defect associated with one or both of the bus or the one or more pins based at least in part on detecting that the bus in the second state or the third state.

13. The method of claim 12, further comprising:
receiving, at the controller from the memory array, the second data based at least in part on transmitting the second command and determining the absence of the defect.

14. The method of claim 12, wherein:
the first state is associated with an absence of data being communicated over the bus;
the second state is associated with a first logic value of a bit in the second data; and
the third state is associated with a second logic value of a second bit in the second data.

15. The method of claim 10, further comprising:
communicating a strobe signal over the bus after transmitting the command for the data, wherein detecting the first state is based at least in part on communicating the strobe signal.

16. The method of claim 10, wherein the first state comprises an absence of a voltage being applied to the bus.

17. A method, comprising:
transmitting, from a host device to a memory device over a bus coupled with the host device and one or more pins of the memory device, a command for data, the bus coupled with a resistor and a power supply associated with the memory device;
detecting that the bus is operating in a first state based at least in part on transmitting the command, the first state comprising a voltage that is relatively higher than a voltage of a second state and the first state based at least in part on an absence of data communicated over the bus; and
determining an error associated with the transmission of the command for the data based at least in part on detecting that the bus is in the first state.

18. The method of claim 17, further comprising:
transmitting, from the host device over the bus, a second command for second data;
detecting that the bus is in the second state based at least in part on transmitting the second command;
determining an absence of the error associated with the transmission of the second command for the second data based at least in part on detecting that the bus is in the second state; and receiving, at the host device, the second data based at least in part on transmitting the second command and detecting the bus in the second state.

19. The method of claim 17, wherein the bus is in the first state based at least in part on a resistor coupled with the bus and with a power supply of a memory device coupled with the host device.

20. The method of claim 17, further comprising:
transitioning a memory device coupled with the bus from a first state associated with communicating information to a second state associated with disabling a functionality of the memory device based at least in part on determining the error.

21. A system, comprising:
a host device configured to communicate a command for data;
a memory device comprising one or more pins that are configured to communicate data to and from an array of the memory device in response to the command from the host device;
a bus coupled with the one or more pins that are configured to communicate data and the host device and configured to communicate data between the memory device and the host device in response to the command; and
a resistor coupled with the bus and a power supply of the memory device and configured to cause the bus to operate in a first state based at least in part on an absence of data communicated over the bus, the first state comprising a voltage that is relatively higher than a voltage of a second state.

22. The system of claim 21, wherein the host device is further configured to determine a defect associated with one or both of the bus or the one or more pins based at least in part on detecting that the bus is in the first state after communicating the command.

23. The system of claim 21, wherein the memory device is further configured to drive the bus to the second state based at least in part on communicating in response to the command.

24. The system of claim 21, wherein the memory device is further configured to drive the bus to a third state based at least in part on communicating data in response to the command, the third state comprising a voltage that is relatively higher than the voltage of the first state.

25. An apparatus, comprising:
a memory array comprising one or more pins for communicating data to and from the memory array; and
a controller coupled with the memory array and configured to:
receive, a command for data;
transmit, to the memory array over a bus that is coupled with the controller and the one or more pins of the memory array, the command for the data;
detect, based at least in part on a resistor coupled with the bus and a power supply of the memory array, that the bus is in a first state after transmitting the command for the data, the first state comprising a voltage that is relatively higher than a voltage of a second state; and
determine a defect associated with one or both of the bus or the one or more pins based at least in part on the detecting that the bus is in the first state.

26. The apparatus of claim 25, wherein the controller is further configured to:
transition the memory array from a first state associated with communicating information to a second state associated with disabling a functionality of the memory array based at least in part on determining the defect.

27. The apparatus of claim 25, wherein the controller is further configured to:
receive a second command for a second data;
transmit, to the memory array over the bus, the second command for the second data;
detect that the bus is in the second state or a third state after transmitting the second command for the second data, the third state comprising a voltage that is relatively higher than the voltage of the first state; and
determine an absence of the defect associated with one or both of the bus or the one or more pins based at least in part on detecting that the bus in the second state or the third state.

28. The apparatus of claim 27, wherein the controller is further configured to:
receive from the memory array the second data based at least in part on transmitting the second command and determining the absence of the defect.

29. The apparatus of claim 27, wherein:
the first state is associated with an absence of data being communicated over the bus;
the second state is associated with a first logic value of a bit in the second data; and
the third state is associated with a second logic value of a second bit in the second data.

30. The apparatus of claim 25, wherein the controller is further configured to:
communicate a strobe signal over the bus after transmitting the command for the data, wherein the controller is configured to detect the first state based at least in part on communicating the strobe signal.

* * * * *